United States Patent [19]
Brandsma

[11] 3,913,821

[45] Oct. 21, 1975

[54] VEE-WELDING

[75] Inventor: Mark Brandsma, Bergum, Netherlands

[73] Assignee: Varios-Fabrieken B.V., Groningen, Netherlands

[22] Filed: Aug. 21, 1974

[21] Appl. No.: 499,179

[30] Foreign Application Priority Data
Aug. 22, 1973 Netherlands.................... 7311569

[52] U.S. Cl.................................. 228/216; 228/50
[51] Int. Cl.²........................................ B23K 5/22
[58] Field of Search............ 29/491; 228/50, 56, 57

[56] References Cited
UNITED STATES PATENTS
2,146,901  2/1939  Lane................................. 29/491 X
2,448,107  8/1948  Mattimore et al................ 29/491 X
2,584,072  1/1952  White.................................... 228/50

*Primary Examiner*—James L. Jones, Jr.
*Assistant Examiner*—Margaret Joyce
*Attorney, Agent, or Firm*—Amster & Rothstein

[57] ABSTRACT

The joint between two members to be welded together is closed on one side as they are being welded on the other by means of a backing element which is kept in place by means of bifurcated retaining elements inserted through holes in the backing element and then turned one quarter turn for the prongs to rest with spring force on the opposed surfaces of the joint. The backing element is then confined between the bifurcation and a handle portion of the retaining element.

4 Claims, 2 Drawing Figures

VEE-WELDING

This invention relates to vee-welding, and in particular to a method and means for closing a V-joint between two members on one side thereof as they are being welded on the other side.

In a known method a grooved backing element is clamped against the members to be welded together, with the aid of retaining elements which extend into the V-shaped joint from said one side and having diverging portions resting on the two flanks thereof. In that method the two members or sheets to be welded together must be shifted towards one another in order to clamp down the retaining elements. This renders the prior method difficult of performance. It has also been proposed to use supporting sections carried by magnetic bridges, the sections in their turn carrying the backing elements. These aids represent a considerable cost item and are moreover rather cumbersome to handle, which renders that prior method expensive.

It is an object of the present invention to provide a simplified and more efficient method of closing a V-joint between two members on one side thereof as they are being welded on the other side.

According to one aspect of the present invention, therefore, there is provided a method of closing a joint between two members on one side thereof as they are being welded on the other side, and wherein a backing element is clamped against said members with the aid of retaining elements, which extend into the V-shaped joint from said one side and have diverging portions resting on the two flanks of the joint, characterized in that the diverging portions of the retaining elements are inserted into the joint from said one side after which said retaining elements are turned approximately one quarter turn.

According to another aspect of the present invention, there is provided a backing element for closing a joint between two members on one side thereof as they are being welded together on the other side, characterized by at least one throughbore, through which extends a retaining element so as to be capable of being turned therein and which confines said elements between a V-shaped diverging portion at one side of the backing element and a handle portion at the other side of the backing element.

One embodiment of the invention will be described, by way of example, with reference to the accompanying drawings. In the drawings.

Figure 1:
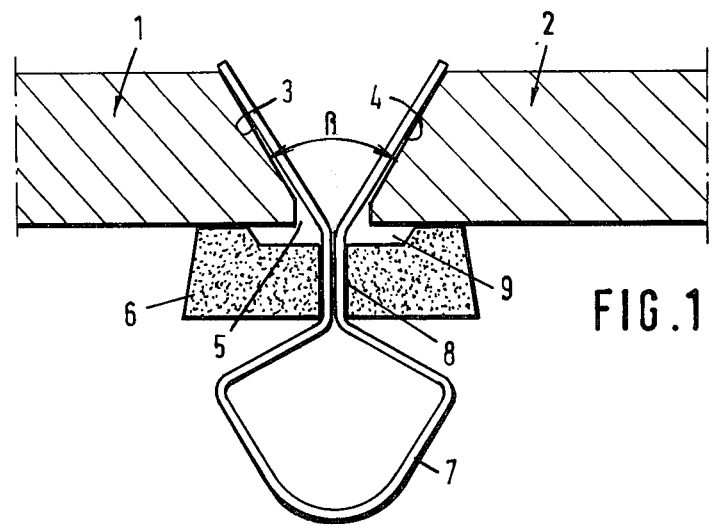
FIG. 1 shows a cross-section of a grooved backing element under a pair of sheets to be welded together.

Referring to the drawings, sheets 1 and 2 to be welded together have bevelled edges 3 and 4, forming a vee joint with small vertical edge portions and an opening 5 at the bottom. This vee joint is closed at the bottom by a grooved backing member 6, retained by a securing spring 7, which extends into welding groove or channel 9 through a throughbore 8. The securing spring 7, which is made of spring steel wire and has a round or angular cross-section, is V-shaped at the sheet side of the welding channel, the wire portions, which have been inserted through the throughbore 8 together and in the same direction, being bent apart from throughbore 8. At the other side of the welding channel the wire forms an eye, the function of which will be described below. The welding channel or recess 9 determines the appearance of the backing run.

Figure 2:
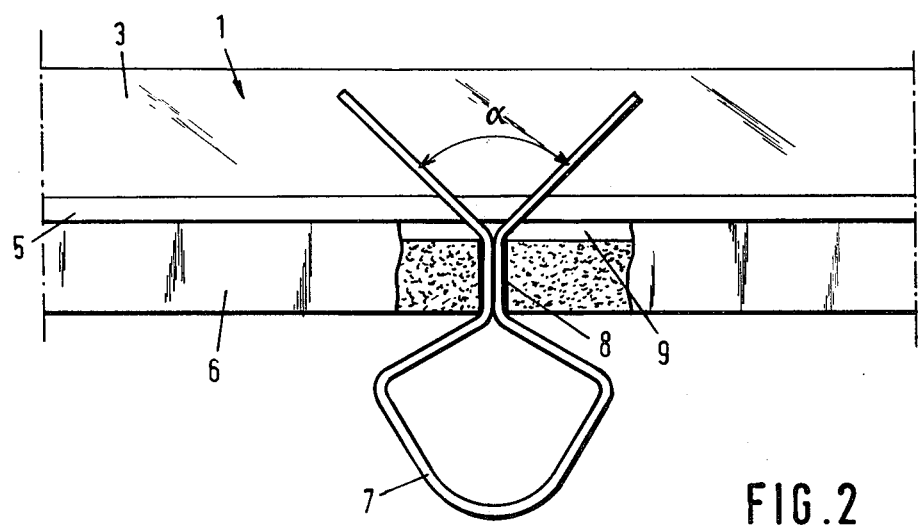
FIG. 2 is a side elevation of the backing element of FIG. 1, in which one of the sheets is not shown and the backing element is partly sectioned.

FIG. 1 shows the situation in which backing element 6 is clampingly secured against the lower side of sheets 1 and 2 by securing spring 7. FIG. 2 shows securing spring 7 in the position in which it can pass through sheets 1 and 2 when element 6 is applied. As will be seen from the drawings, angle $\alpha$ enclosed by the wire portions in the free position is greater than angle $\beta$ of the vee joint shown in FIG. 1.

As shown in FIG. 2, when securing spring 7 is inserted in the vee joint the plane containing the wire portions assuming the form of a V is parallel to a plane that symmetrically bisects the vee joint in longitudinal direction. Securing spring 7 can then be slid through opening 5 in the vee joint until backing element 6 rests against sheets 1 and 2. Securing spring 7 is then turned one quarter turn with the aid of the eye formed by the spring itself as a result of which backing member 6 is clampingly and sealingly pressed against the two sheets 1 and 2. The position thus attained is shown in FIG. 1.

In this position sheets 1 and 2 are welded together from the other side. The portion of securing spring 7 located in the weld joint fuses with the weld metal. At the bottom of the weld the weld metal is collected by welding channel 9. The backing element and that part of securing spring 7 that has not fused with the weld metal drop off after the weld metal has solidified. The appearance of the backing run thus formed is, like that of the internal weld, very beautiful and it is not necessary to chip off slag at the side of the backing run.

A preferred embodiment of the backing element comprises a welding channel about 15 cm long, 2 cm wide and 0.7 cm deep and is provided with two securing springs. It is possible to weld curved surfaces with a plurality of such backing elements; it is even possible to weld curved surfaces with a radius of 1 m. By adapting the length and/or form of the backing members it is also possible to weld surfaces with smaller radii of curvature.

Naturally the backing members and the grooves therein, as well as the securing springs can be modified to suit requirements without departing from the scope of the, for instance, to be able to weld other types of weld joints, such as an acute vee joint, a double vee joint at one side. The invention can also be applied to vertical or inclined weld joints.

I claim:

1. A method of closing a joint on one side between two sheets having V-shaped diverging edges spaced apart at the apex of the V as they are being welded together on the other side, comprising the steps of
    placing on the one side a backing member having at least one throughbore so that said backing member will extend along and abut each sheet adjacent the apex of the V;
    inserting a retaining element having an eye loop at one end and diverging legs at the other end;
    said insertion step allowing said legs to diverge to a predetermined angle between the sheets; and
    rotating said retaining element 90° to thereby move said legs into abutment with the diverging edges of the sheets to form an angle less than said predetermined angle.

2. A device for closing a joint on one side between two sheets having V-shaped diverging edges spaced apart at the apex of the V as they are being welded together on the other side, comprising
- a backing member adapted to extend along and abut the edge of each sheet adjacent the apex of the V;
- said backing member having an outer surface remote from said sheets and an inner surface abutting the sheets;
- said inner surface of said backing member having a channel centrally located and extending transversely for a distance whereby the apex of the V is out of contact with said inner surface;
- at least one throughbore extending through said backing member, said throughbore centrally located in a transverse direction to be in line with the apex of the V;
- a retaining element positionable within said throughbore and having a first portion extending beyond said outer surface of said backing member and having a second portion extending through and beyond said channel and beyond said inner surface of said backing member;
- said first portion formed as an eye loop; and
- said second portion formed as two legs defining a V-shaped configuration and adapted to respectively extend along and abut the V-shaped diverging edges of the sheets.

3. A device according to claim 2 wherein a plurality of throughbores are formed in said backing member, and a corresponding number of retaining elements are provided to be positionable therein.

4. A device according to claim 2 wherein said retaining element is formed of spring metal and positionable in a first position wherein its said legs are out of contact with the V-shaped diverging edges of the sheets and form a predetermined angle, said retaining element is rotatable within said throughbore to a second position whereby its said legs are in abutment with the diverging edges of the sheets, and the angle formed by said legs in said second position is less than said predetermined angle.

* * * * *